United States Patent [19]

Swensen

[11] Patent Number: 4,527,149
[45] Date of Patent: Jul. 2, 1985

[54] DATA DISPLAY KEYBOARD WITH ANGULAR POSITIONING

[75] Inventor: Michael W. Swensen, Austin, Tex.

[73] Assignee: Texas Instruments Incorporated, Dallas, Tex.

[21] Appl. No.: 461,810

[22] Filed: Jan. 28, 1983

[51] Int. Cl.³ .............................................. G06F 3/02
[52] U.S. Cl. .............................. 340/365 R; 400/682; 248/398
[58] Field of Search ........................ 340/365 R, 365 S; 400/682, 496, 472; 248/293, 398

[56] References Cited

U.S. PATENT DOCUMENTS 3,830,352  8/1974  Kolpek .................................. 400/682
3,902,034  8/1975  Isozaki .................................. 400/682

FOREIGN PATENT DOCUMENTS 0037846  10/1981  European Pat. Off. ............ 400/682

OTHER PUBLICATIONS

IBM Technical Disclosure Bulletin, vol. 24, No. 12, May, 1982, "Keyboard Angle Adjustment", Kelley, Jr. et al.
IBM Technical Disclosure Bulletin, vol. 25, No. 4, Sep., 1982, "Adjustable Keyboard Mechanism", Frank et al.
IBM Technical Disclosure Bulletin, vol. 25, No. 6, Nov., 1982, "Keyboard Tilt Mechanism", Golledge.
IBM Technical Disclosure Bulletin, vol. 25, No. 8, Jan., 1983, "Keyboard Assembly", Greenfield et al.

*Primary Examiner*—Gerald L. Brigance
*Attorney, Agent, or Firm*—Thomas G. Devine; Leo N. Heiting; Melvin Sharp

[57] ABSTRACT

A data display device has a manual input keyboard device that is infinitely adjustable with respect to its supporting surface between predetermined limits. The angular displacement mechanism that provides this adjustment is made up of a fixed arbor attached to the keyboard device and a rotating arbor attached to a foot. The arbors are axially aligned and rotatably connected together by a clutch coil spring. A manually operable push button mechanism on the keyboard device is linked to the tang of the coil spring so that when depressed, the tang is moved in a direction to unwind the coil spring, thereby permitting the locating arbor to rotate with respect to the fixed arbor, moving the foot away from the keyboard device. A tilt torsion spring is anchored to the movable arbor and connected to the keyboard device to cause the rotatable arbor to rotate when the push button is actuated thus moving the foot with respect to the keyboard device. Releasing the push button permits stopping the movement of the foot at any desired position.

10 Claims, 7 Drawing Figures

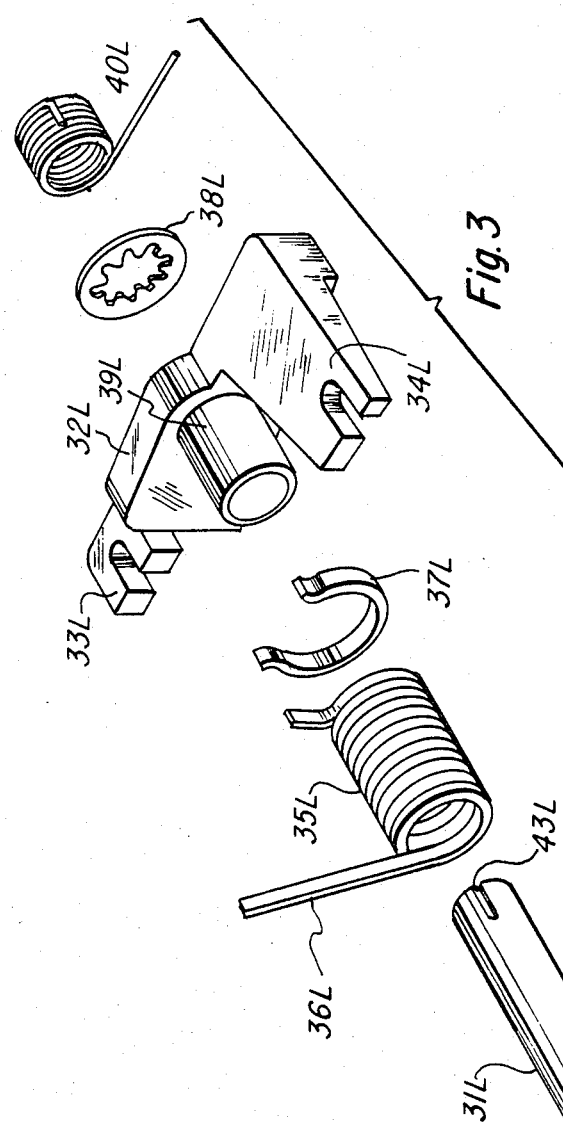
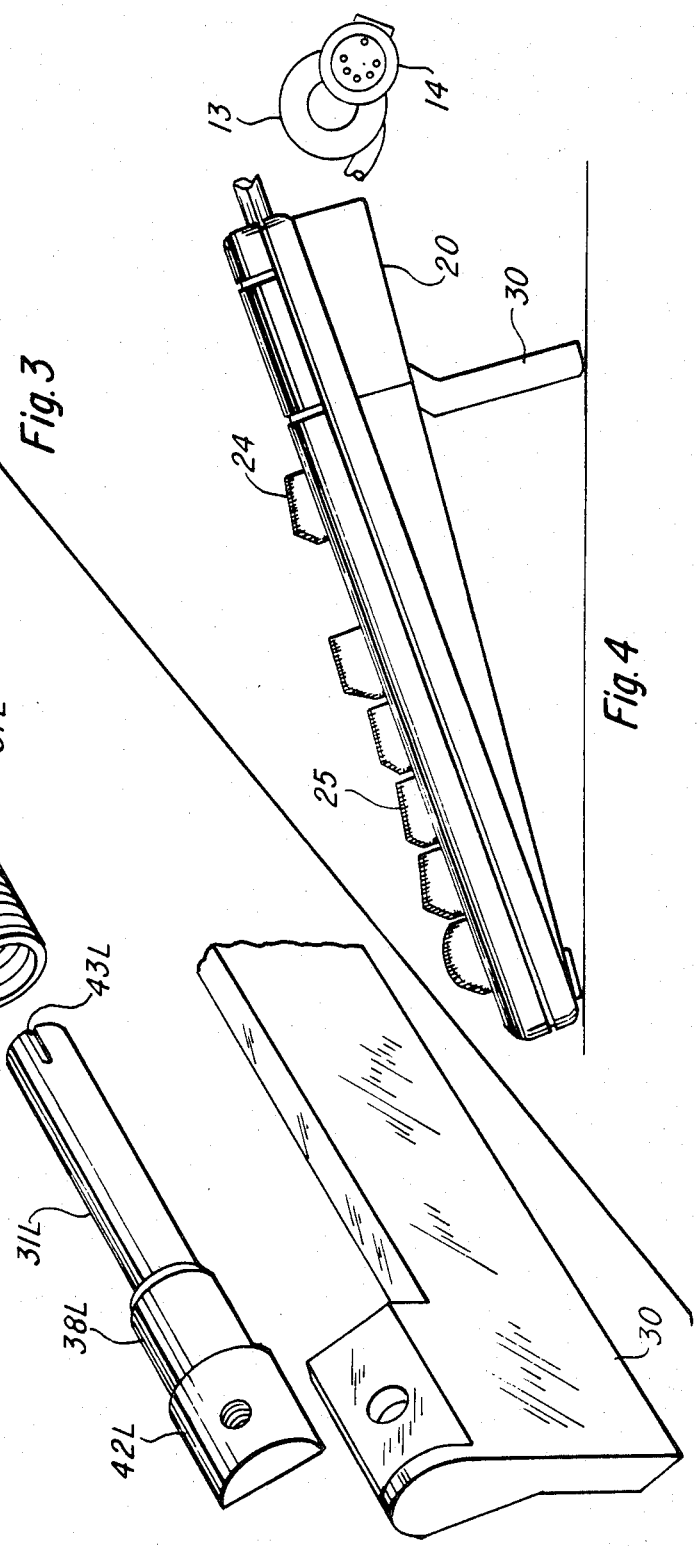

DATA DISPLAY KEYBOARD WITH ANGULAR POSITIONING

BACKGROUND OF THE INVENTION

This invention relates to a manual input keyboard device for data display apparatus. More specifically, it refers to data display apparatus having a manual input keyboard device that is infinitely angularly adjustable with respect to its supporting surface within predetermined limits.

Field of the Invention

Most state of the art keyboards for computers, terminals and the like are not adjustable, but are set at an angle of approximately 15 degrees from the supporting surface.

Other prior art keyboards may be set at approximately 5 degrees or approximately 12 degrees. This is accomplished by two separate legs that swing down into a detent position for the 12 degree setting.

State of the art keyboards for small computers, terminals and the like are generally detachable. The keyboard may therefore be somewhat remote from the system to which it is attached and may be located where the setting of the keyboard is not necessarily satisfactory at either 5 degrees or 12 degrees from the support surface. This invention permits any setting between approximately 5 degrees and approximately 18 degrees.

Another feature of this invention is a single extended bar which replaces a pair of feet. This single bar enables the placement of the keyboard and the ability to adjust it when on an uneven surface, such as an operator's lap.

BRIEF SUMMARY OF THE INVENTION

According to this invention, a tilting foot is provided toward the rear edge of a manual input keyboard device for a personal computer. The foot is connected to a latch/release mechanism at each end of the keyboard device. Each latch/release mechanism is actuated by its own push button mechanism, operable from the keyboard device.

The latch/release mechanism is made up of a fixed arbor attached to the keyboard device and a rotating arbor attached to the foot. The arbors are axially aligned and a clutch coil spring, with an interference fit, rotatably connects the two arbors. When the push button is actuated, a leaf spring is engaged which in turn engages the tang of the clutch coil spring, tending to unwind the coil spring. This motion permits the two arbors to rotate with respect to each other, thereby enabling the foot to move with respect to the keyboard device.

A tilt torsion spring is anchored to the rotating arbor and connected to the keyboard device, positioned to urge the rotating arbor to rotate in a direction to move the foot. This movement occurs when the push button is depressed and the clutch coil spring is slightly unwound. Motion of the foot is stopped, when desired, by releasing the push button.

BRIEF DESCRIPTION OF THE DRAWINGS

FIG. 3 is an exploded view of the angular positioning mechanism of this invention.

FIG. 4 is a side view of the keyboard assembly with the tilting foot extended.

DETAILED DESCRIPTION OF THE INVENTION

Figure 1:
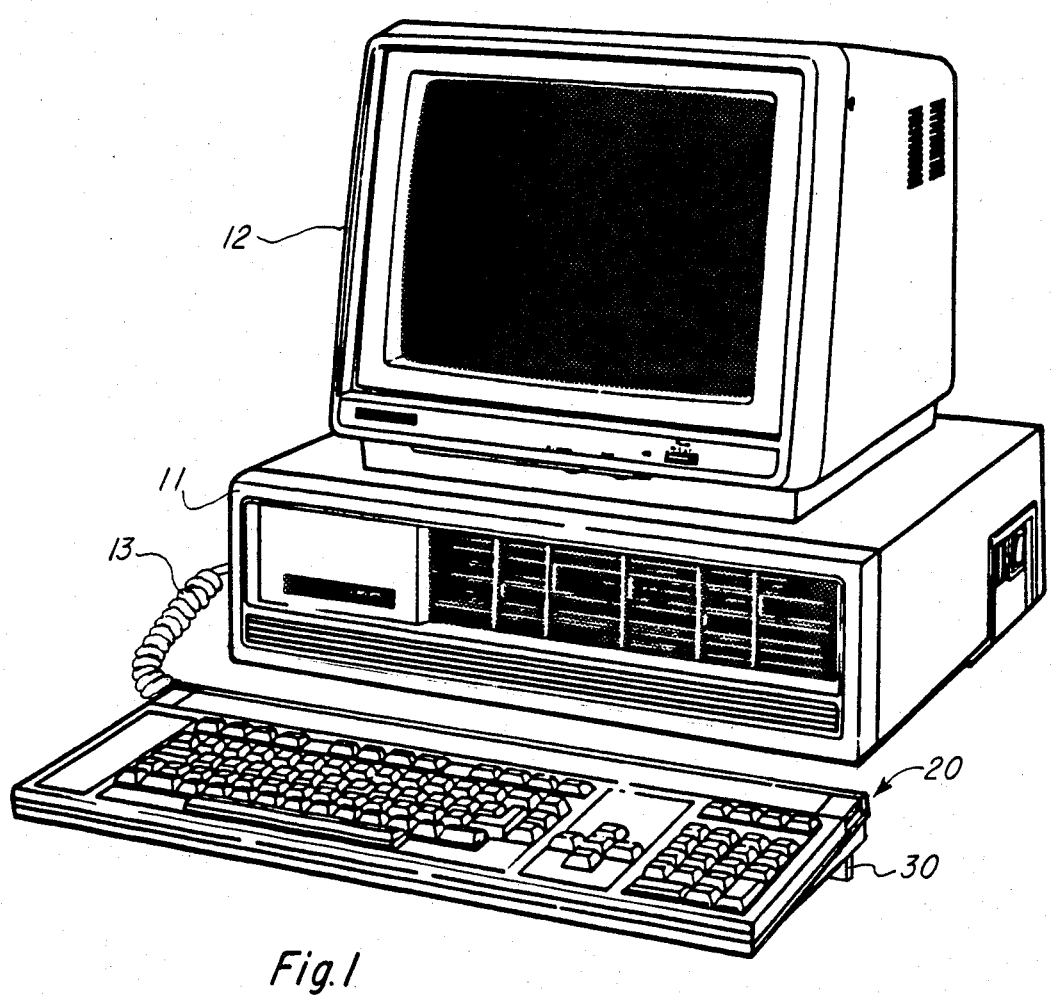
FIG. 1 is a perspective of the digital apparatus of this invention.

In FIG. 1, computer 11 having display 12 is connected through cord 13 to manual input keyboard device 20 with foot 30 shown in position. Computer 11 and display 12 may be any of the personal computers available, such as the personal computer of International Business Machines Corpation. A personal computer is shown, but any terminal or other computer, with appropriate interface adjusting, could be connected to the manual input keyboard device 20 of this invention.

Figure 2:
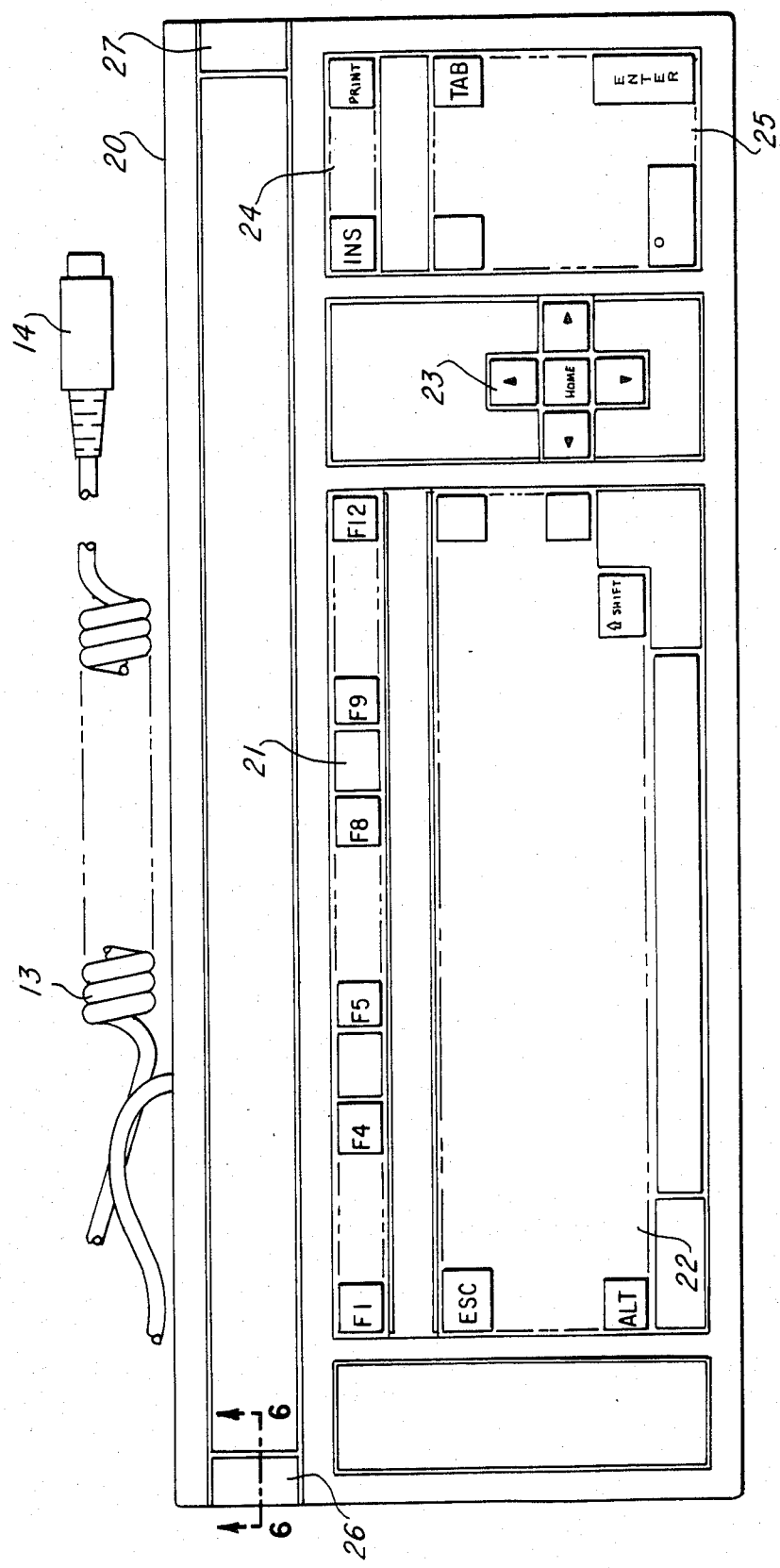
FIG. 2 is a top view of a manual input keyboard device of this invention.

FIG. 2 is a top view of manual keyboard device 20 illustrating keyboard sections 21, 22, 23, 24 and 25. All of the keys are not shown for purposes of clarity. Push button 26 and push button 27 are shown. As will be described, these push buttons activate the angular positioning mechanisms of this invention. The keyboard in this preferred embodiment, is that described in U.S. Pat. No. 4,263,582.

FIG. 3 is an exploded view illustrating the various components of the angular positioning apparatus of the left side of the manual input keyboard device. Rotating arbor 38L is shown having connecting shoulder 42L and reduced diametr 31L. Shoulder 42L is connected to plane 41L of foot 30. Clutch coil spring 35L having an inside diameter somewhat less than the diameter of rotating arbor 38L and fixed arbor 39L fits tightly over those two arbors. Positioning clip 37L is used to position clutch spring 35L. Mounting brackets 33L and 34L connect fixed arbor 39L to the device 20. Reduced diameter 31L enters the inside diameter of arbor 39L. Retaining ring 38L and tilt torsion spring 40L fit over rod 31L. Tilt torsion spring 40L is anchored to the reduced diameter 31L, by its tang fitting into the slot 43L.

FIG. 4 is a side view of device 20 showing cord 13 and connector 14. Right hand push button 27 for activation of the angular positioning mechanism is shown above foot 30 which is shown in its fully extended position. Keyboard sections 24 and 25 are also shown.

Figure 5:
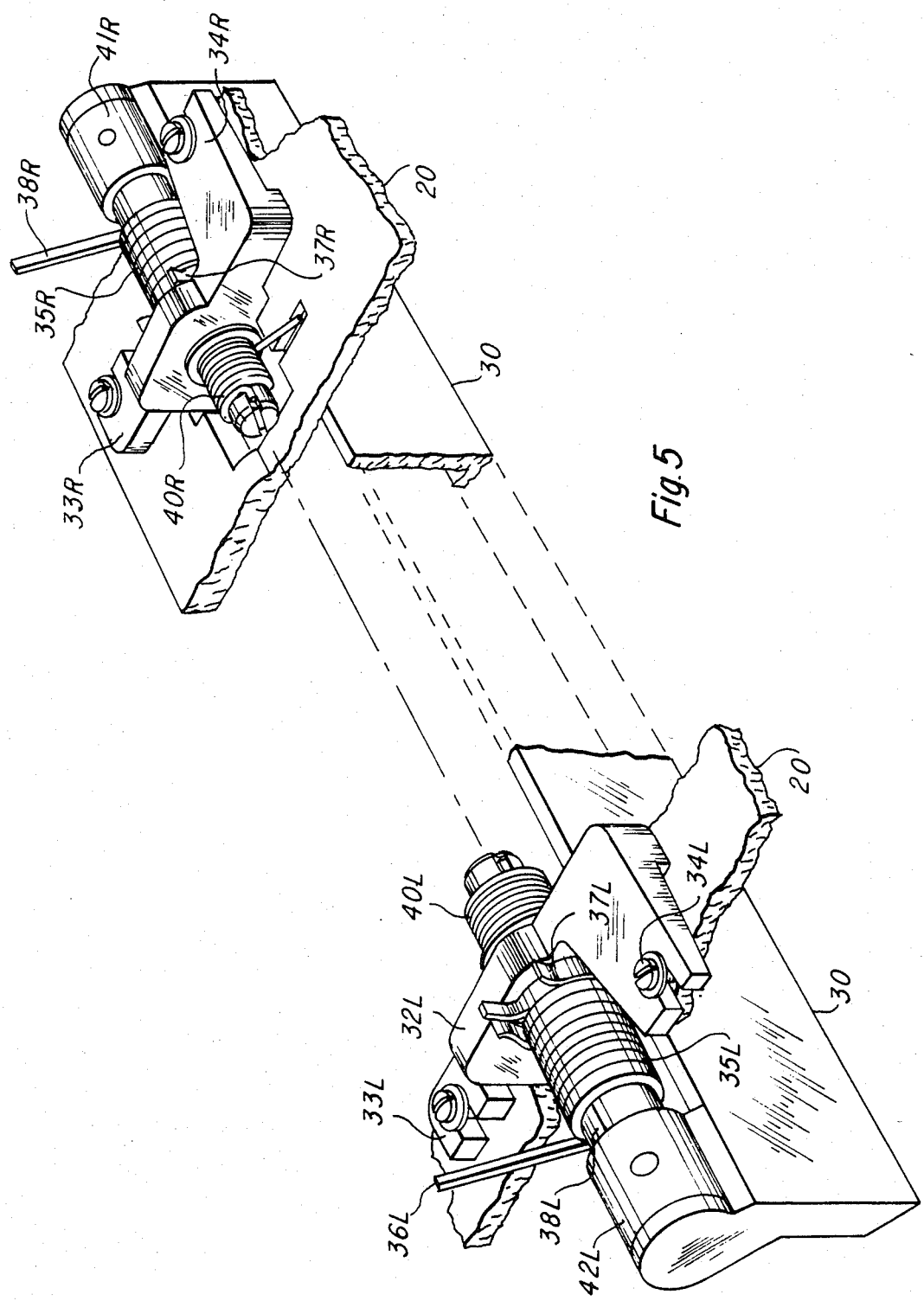
FIG. 5 is a perspective, sectioned view of the two angular positioning mechanisms.

FIG. 5 is a perspective drawing illustrating both the left and right hand angular positioning mechanisms. A description of the left hand mechanism will suffice for an understanding because the right hand mechanism is a mirror image. Foot 30 is shown with shoulder 42L connected thereto. Spring 35L is shown in position over rotating arbor 38L and stationary arbor 39L. Mounting extensions 33L and 34L are shown bolted in position on the device 20. Also shown in position are retaining clip 37L and tilt torsion spring 40L.

MODE OF OPERATION

Figure 6A:
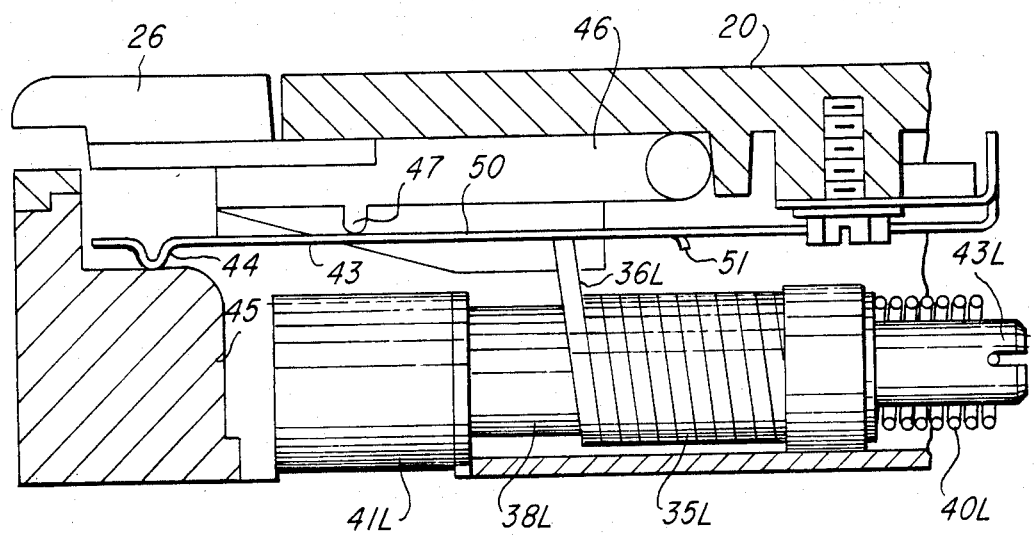
FIGS. 6A and 6B are cross sections of the angular positioning mechanism inactivated and activated, respectively, taken at section 6—6 of FIG. 2.
Figure 6B:
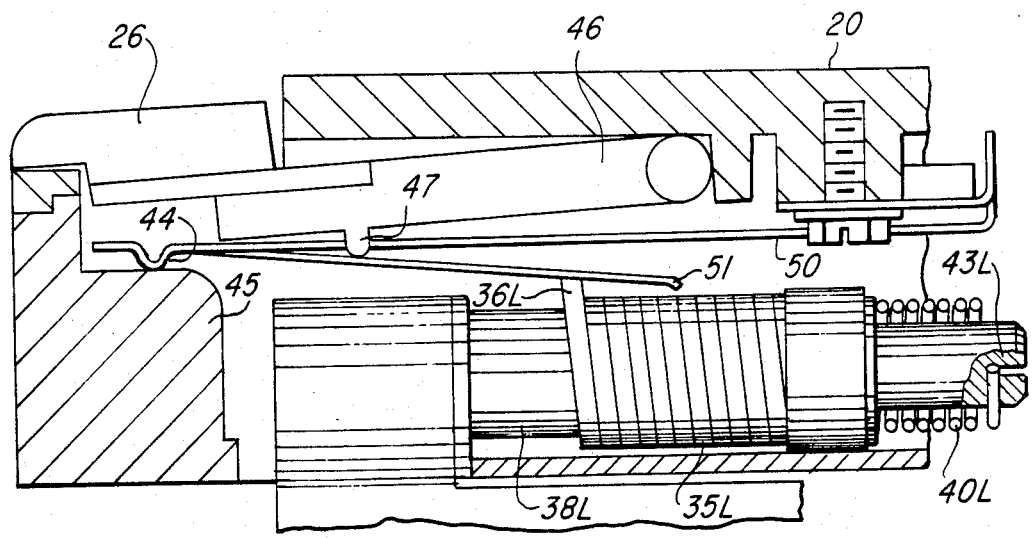

With particular attention directed now to FIGS. 6A and 6B, the operation of the angular positioning mechanism will be described. FIGS. 6A and 6B are taken through a section 6—6 illustrated in FIG. 2.

In FIG. 6A, push button 26 is shown having extension 46 with contact ridge 47 an integral part thereof. Linking mechanism 50 is a leaf spring having a contact portion 44 contacting shoulder section 45 of device 20. Clutch coil spring 35L is shown with its tang 36L extending upwardly.

In FIG. 6B, push button 26 has been depressed, contacting spring section 51 which in turn presses against tang 36L. When tang 36L is pressed in this direction, spring 35L tends to unwind. When spring 35L tends to unwind, rotating arbor 38L is free to move as urged by tilt torsion spring 40L. When arbor 38L moves, foot 30 also moves in a downward position, such movement stopped by releasing push button 26. When push button 26 is released, then the mechanism goes back in the position as shown in FIG. 6A. Movement of the foot stops.

In this preferred embodiment, an extended foot 30 is shown. This enables placing the device 20 in an operator's lap or on some other uneven surface. It should, however, be understood that this invention would be applicable to a manual input keyboard device having individual feet on each side. That is, foot 30 could be replaced by a single foot operated by the push button 26 and a single foot operated by the push button 27.

This preferred embodiment has shown particular configurations of arbor springs and direction of movement of the foot 30 when activated by push button 26, all of which can be modified, including the direction of movement. These modifications are contemplated and the invention is limited only by the appended claims.

What is claimed is:

1. Manual input for providing electrical inputs to data handling apparatus, comprising:
   (a) a frame assembly;
   (b) a keyboard assembly mounted on the frame assembly;
   (c) at least one foot movably mounted mounted to the frame assembly;
   (d) latch/release means connected to the foot to permit the foot to move with respect to the frame assembly between two limits, thereby adjusting the angle of the frame assembly with respect to the supporting surface, the latch/release means including a selectively actuable clutch mechanism for releasing and positively latching the foot at any angle between the two limits, and displacing means for moving the foot relative to the frame assembly; and
   (e) actuating means, connected to the latch/release means for manual release and selective latching of the foot at any desired angle between the frame assembly and the supporting surface between the two limits.

2. The apparatus of claim 1 wherein the actuating means comprises at least one push button movably mounted in the frame assembly and linked to the clutch mechanism.

3. An angular positioning mechanism for tilting a plane to any desired angular position within predetermined limits from its supporting surface, comprising:
   (a) at least one foot movably mounted to the plane;
   (b) latch/release means connected to the foot to permit the foot to move with respect to the plane between two limits thereby adjusting the angle of the plane with the supporting surface wherein the latch/release means includes at least one selectively actuable clutch mechanism for releasing and positively latching the foot at any angle between the two limits, and displacing means for moving the foot relative to the plane; and
   (c) actuating means connected to the latch/release means for manual release and selective latching of the foot at any desired angle between the plane and the supporting surface between the two limits.

4. The mechanism of claim 3 wherein the actuating means comprises at least one push button movably mounted to the plane and linked to the clutch mechanism.

5. Manual input apparatus for providing electrical inputs to data handling apparatus, comprising:
   (a) a frame assembly;
   (c) a keyboard assembly mounted on the frame assembly;
   (c) at least one foot movably mounted to the frame assembly;
   (d) latch/release means connected to the foot to permit the foot to move with respect to the frame assembly, thereby adjusting the angle of the frame assembly with respect to the supporting surface wherein the latch/release means includes a selectively actuable clutch mechanism for releasing and latching the foot, and displacing means for moving the foot relative to the frame assembly, wherein the clutch means comprises a fixed arbor, attached to the frame assembly, a rotating arbor attached to the foot and axially aligned to rotate with respect to the fixed arbor, a clutch coil spring, having a tang, encircling the fixed and rotating arbors, dimensioned to rotatably lock the arbors together, and a leaf spring, actuated by the push button, for engaging the tang when the push button is pressed to tend to unwind the clutch coil spring, thereby permitting the rotating arbor to rotate with respect to the fixed arbor, and the foot to move with respect to the frame assembly; and
   (e) actuating means, connected to the latch/release means, for manual release and selective latching of the foot at the desired angle between the frame assembly and the supporting surface wherein the actuating means comprises at least one push button movably mounted in the frame assembly and linked to the clutch mechanism.

6. The apparatus of claim 5 wherein the displacing means comprises a tilt torsion spring, attached to the frame assembly and anchored to the rotating arbor, positioned to urge the rotating arbor to rotate in a direction to cause the foot to move with respect to the frame assembly.

7. The apparatus of claim 6 comprising a clutch mechanism at opposite sides of the frame assembly, and a single foot extending between, and attached to, the clutch mechanisms.

8. An angular positioning mechanism for tilting a plane to any desired angular position within predetermined limits from its supporting surface, comprising:
   (a) at least one foot movably mounted to the plane;
   (b) latch/release means connected to the foot to permit the foot to move with respect to the plane, thereby adjusting the angle of the plane with the supporting surface, wherein the latch/release means includes at least one selectively actuable clutch mechanism for releasing and latching the foot, and displacing means for moving the foot relative to the plane, and wherein the clutch mechanism comprises a fixed arbor, attached to the frame assembly, a rotating arbor attached to the foot and axially aligned to rotate with respect to the fixed arbor, a clutch coil spring having a tang, encircling the fixed and rotating arbors, dimensioned to rotatably lock the arbors together, and a leaf spring for engaging the tang when the push button is pressed in a direction to tend to unwind the clutch coil spring, thereby permitting the rotating arbor to rotate with respect to the fixed arbor, and the foot to move with respect to the plane, and (c) actuating means, including at least one push button movably mounted to the plane and linked to the clutch mechanism, connected to the latch-/release means for manual release and selective latching of the foot at a desired angle between the plane and the supporting surface.

9. The mechanism of claim 8 wherein the displacing means comprises a tilt torsion spring, attached to the plane and anchored to the rotating arbor, positioned to urge the rotating arbor to rotate in a direction to cause the foot to move with respect to the plane.

10. The mechanism of claim 9 comprising a clutch mechanism at opposite sides of the frame assembly and a single foot, extending between and attached to the clutch mechanisms.

* * * * *